United States Patent
Wu et al.

(10) Patent No.: US 10,527,312 B2
(45) Date of Patent: Jan. 7, 2020

(54) HEAT EXCHANGE DEVICE

(71) Applicants: PANASONIC ECOLOGY SYSTEMS GUANGDONG CO., LTD., Guangdong (CN); PANASONIC CORPORATION, Osaka (JP)

(72) Inventors: Kunran Wu, Guangdong (CN); Zhenhong Yang, Guangdong (CN); Kouji Iio, Aichi (JP); Norihiko Hasegawa, Aichi (JP)

(73) Assignees: PANASONIC ECOLOGY SYSTEMS GUANGDONG CO., LTD. (CN); PANASONIC CORPORATION (JP)

( * ) Notice: Subject to any disclaimer, the term of this patent is extended or adjusted under 35 U.S.C. 154(b) by 85 days.

(21) Appl. No.: 15/737,807

(22) PCT Filed: Jun. 13, 2016

(86) PCT No.: PCT/CN2016/085537
§ 371 (c)(1),
(2) Date: Dec. 19, 2017

(87) PCT Pub. No.: WO2016/206544
PCT Pub. Date: Dec. 29, 2016

(65) Prior Publication Data
US 2019/0032952 A1   Jan. 31, 2019

(30) Foreign Application Priority Data

Jun. 26, 2015   (CN) .................... 2015 2 0449106 U

(51) Int. Cl.
*F24F 12/00*   (2006.01)
*F24F 13/22*   (2006.01)
*F24F 13/30*   (2006.01)

(52) U.S. Cl.
CPC ............ *F24F 12/001* (2013.01); *F24F 13/22* (2013.01); *F24F 13/30* (2013.01)

(58) Field of Classification Search
CPC .. F28F 2270/00; F28F 2280/06; F24F 12/001; F24F 12/006; F24F 1/54; F24F 2013/205; F24F 13/22
See application file for complete search history.

(56) References Cited

U.S. PATENT DOCUMENTS 2,702,994 A  *  3/1955  Borgerd ................. F24F 1/022
                                                    165/48.1
4,194,488 A  *  3/1980  Bellaff ................. F24H 9/2085
                                                    110/160

(Continued)

FOREIGN PATENT DOCUMENTS

CN         201396899 Y        2/2010
CN         105003996 A       10/2015

(Continued)

OTHER PUBLICATIONS

International Search Report issued in PCT/CN2016/085537 dated Sep. 14, 2016, 6 pages.

(Continued)

*Primary Examiner* — Tho V Duong
(74) *Attorney, Agent, or Firm* — RatnerPrestia

(57) ABSTRACT

A heat exchange device includes: a case, a fan provided inside the case and having a fan air outlet and a fan air inlet, a heat exchange element provided inside the case, a case air port formed in the case, and an adapter connected to the case air port at one end thereof, the adapter including more than one pipe connecting portions with different diameters, the pipe connecting portion closest to the case air port being a first pipe connecting portion, the pipe connecting portion farthest from case air port being a second pipe connecting portion; the diameter of the first pipe connecting portion is (Continued)

larger than the diameter of the second pipe connecting portion, and a thermal insulation component is provided in the adapter and has an air passage therein for passing air therethrough. The disclosure is advantageous in preventing occurrence of condensation and improving product safety.

8 Claims, 4 Drawing Sheets

(56) References Cited

U.S. PATENT DOCUMENTS

| | | | | | |
|---|---|---|---|---|---|
| 4,409,955 | A | * | 10/1983 | Christian | F23B 90/06 |
| | | | | | 126/103 |
| 4,550,772 | A | * | 11/1985 | Knoch | F28D 21/0008 |
| | | | | | 165/47 |
| 6,209,622 | B1 | * | 4/2001 | Lagace | F24F 3/1423 |
| | | | | | 165/8 |

FOREIGN PATENT DOCUMENTS

| | | | |
|---|---|---|---|
| CN | 204806611 U | | 11/2015 |
| JP | 09170771 A | | 6/1997 |
| JP | 1132522 A | * | 5/1999 |
| WO | 0122021 A1 | | 3/2001 |

OTHER PUBLICATIONS

Written Opinion of the International Searching Authority issued in PCT/CN2016/085537 dated Sep. 14, 2016, 6 pages.

* cited by examiner

US 10,527,312 B2

HEAT EXCHANGE DEVICE

CROSS-REFERENCE TO RELATED APPLICATION

This application claims the benefit of Chinese Patent Application No. 201520449106.X filed on Jun. 26, 2015 in the State Intellectual Property Office of China, the disclosure of which is incorporated in entirety herein by reference.

BACKGROUND OF THE INVENTION

Field of the Invention

The present disclosure relates to a heat exchange device.

Description of the Related Art

FIG. 1 is a schematic diagram showing a known technology. As shown, disclosed is an existing heat exchanger 1 comprising a case 2, a fan (not shown) and a heat exchange element (not shown) provided in the case 2. The case 2 is formed with an outdoor air inlet 21, an outdoor air outlet 22, an indoor air inlet 23 and an indoor air outlet 24, wherein the outdoor air inlet 21, the outdoor air outlet 22, the indoor air inlet 23 and the indoor air outlet 24 are respectively provided with an adapter 3, each of which is connected to a pipe 4. The heat exchanger 1 is provided on the ceiling of a room, and the pipe 4, which is connected to the outdoor air outlet 22 or to the outdoor air inlet 21, comprises a part disposed in the room and another part disposed outside the room.

In the winter, when the heat exchanger 1 is started and the fan is rotated, cold air enters the room through the pipe 4. There is a temperature difference between the outdoor temperature and the indoor temperature, thus when the cold air enters the part of the pipe 4 in the room, heat transfer occurs between such cold air and indoor air having a relatively higher temperature, causing condensation at the part of the pipe 4 or at the adapter 3 outside the body of the heat exchanger. Similarly, temperature of the indoor air after passing through the heat exchange element drops, causing a temperature difference with the other indoor air, thus heat transfer and condensation occurs. Therefore, in order to prevent condensation, an existing thermal insulation pipe is used, which not only blocks heat transfer at the pipe 4 between two airflows having a temperature difference therebetween, but also covers the adapter so as to blocks heat transfer at the adapter 3 between two airflows having a temperature difference therebetween.

In addition, in order to accommodate thermal insulation pipes with different diameters in the market, an existing metal adapter 3 comprised of a first circular ring 5 and a second circular ring 6 having different diameters is provided, the diameter of the second circular ring 6 closer to the pipe 4 is smaller than the diameter of the first circular ring 5 closer to the heat exchanger 1. Thus, when the diameter of the thermal insulation pipe is larger than the diameter of the first circular ring 5, the whole adapter 3 is covered by the thermal insulation pipe. In addition, when the diameter of the thermal insulation pipe is larger than the diameter of the second circular ring 6 but smaller than the diameter of the first circular ring 5, the second circular ring 6 is covered by the thermal insulation pipe and meanwhile a sponge is bound around the first circular ring 5, thereby blocking heat transfer even at the first circular ring 5 not covered by the thermal insulation pipe.

However, although the first circular ring 5 of the adapter 3 is covered by the sponge, it cannot be ensured that each worker wraps the sponge tightly around the first circular ring 5 without any gaps, thus there is still a potential danger for condensation. In addition, such a wrapping method is time-consuming, and the operation is complex and not easy.

SUMMARY

An object of the present disclosure is to provide a heat exchange device, which can not only prevent condensation effectively but also can be installed in a convenient and simple way.

In order to achieve the above object, the present disclosure provides a heat exchange device, comprising: a case,
  a fan provided in the case and having a fan air outlet and a fan air inlet,
  a heat exchange element provided in the case,
  a case air port provided in the case, and
  an adapter connected to the case air port at one end thereof, the adapter being comprised of more than one pipe connecting portions with different diameters, the pipe connecting portion closest to the case air port being a first pipe connecting portion, the pipe connecting portion farthest from the case air port being a second pipe connecting portion, the diameter of the first pipe connecting portion is larger than the diameter of the second pipe connecting portion, and a thermal insulation component is provided in the adapter and provided with an air passage therein for passing air therethrough.

The disclosure is advantageous in preventing occurrence of condensation and improving product safety.

DETAILED DESCRIPTION OF PREFERRED EMBODIMENTS

Figure 1:
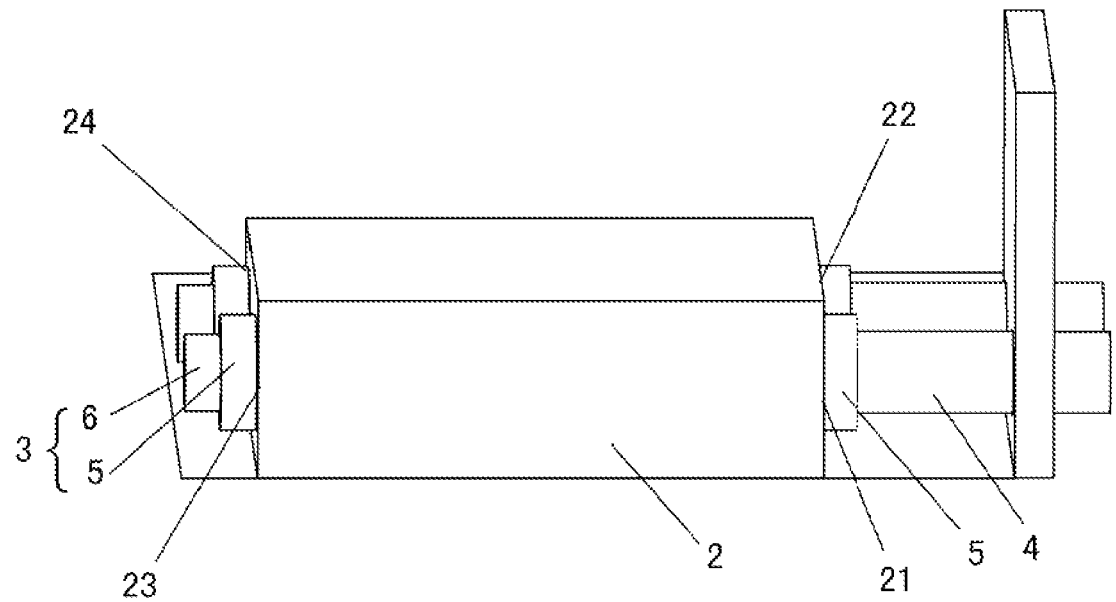
FIG. 1 is a schematic view of a known technology.
Figure 2:
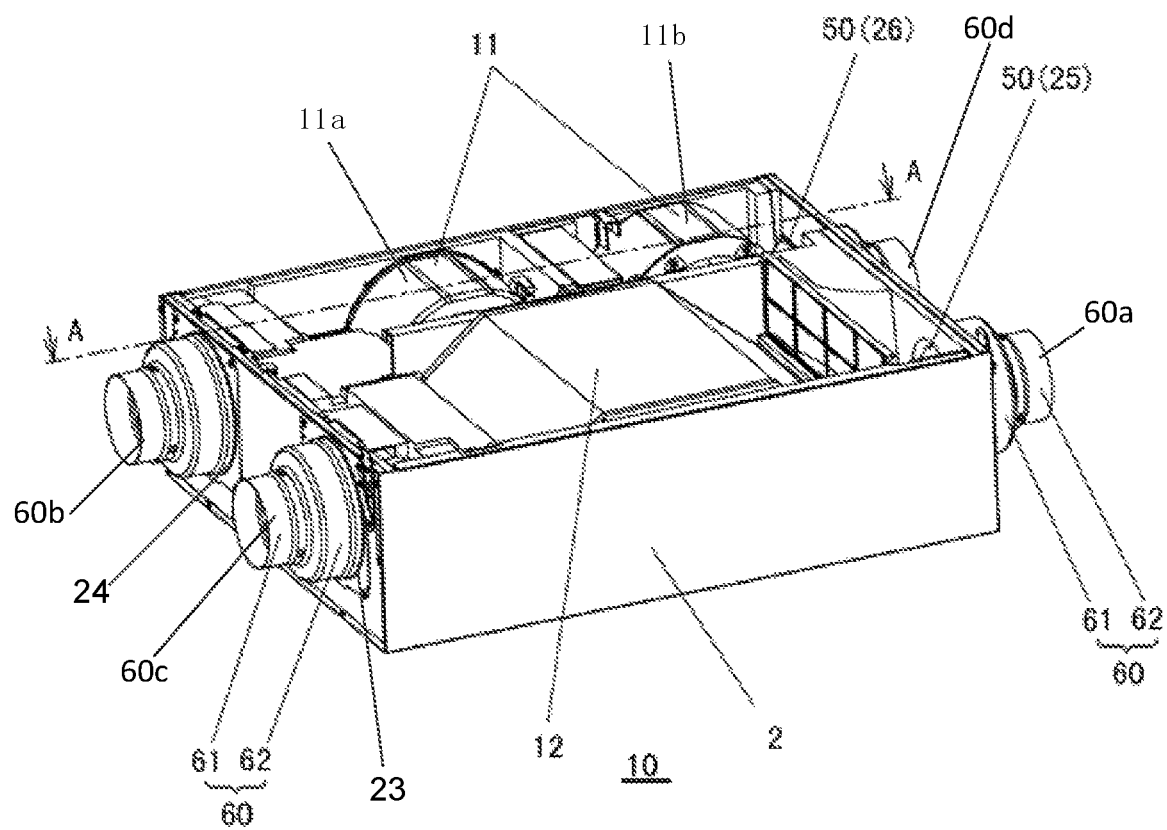
FIG. 2 is a general schematic view of an embodiment of the present disclosure.
Figure 3:
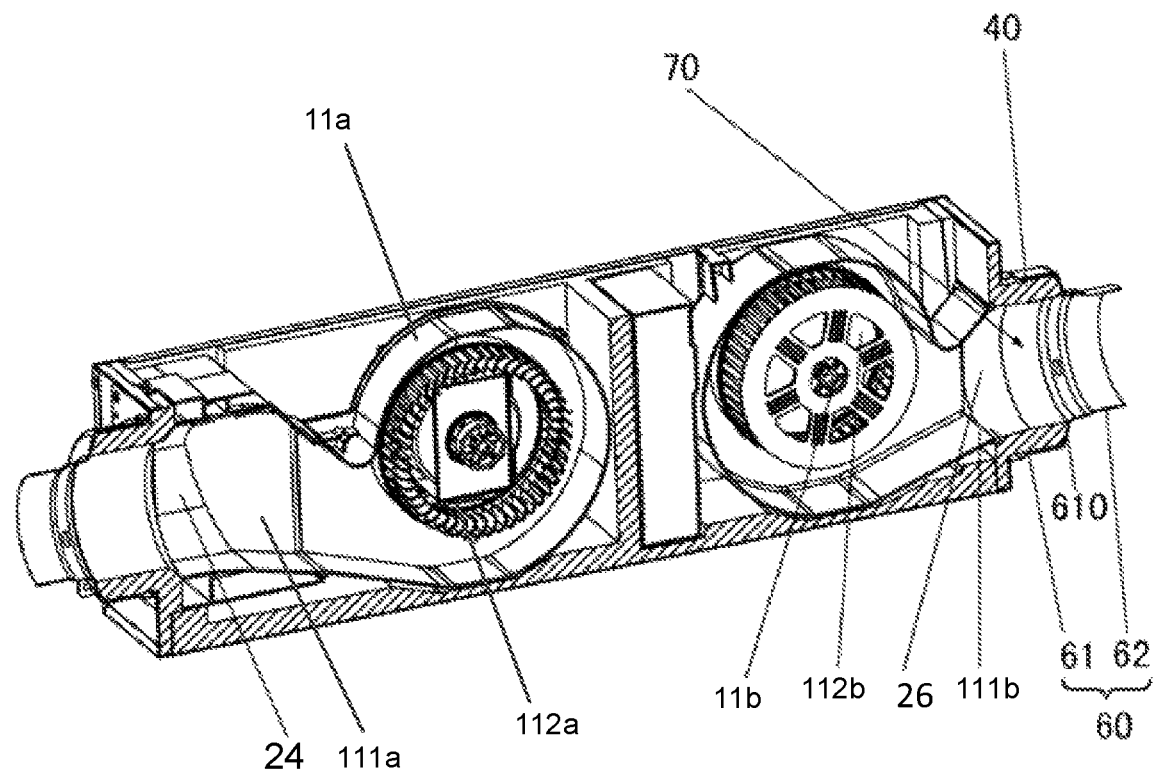
FIG. 3 is a cross-sectional view taken along the line A-A in FIG. 2.

FIG. 2 is a general schematic view of an embodiment of the present disclosure. FIG. 3 is a cross-sectional view taken along the line A-A in FIG. 2.

As shown in FIGS. 2 and 3, a heat exchange device 10 according to the present disclosure includes a case 2, wherein the case 2 is of substantially rectangular shape. The heat exchange device 10 further includes two fans 11, i.e. a first fan 11a and a second fan 11b, provided inside the case 2, wherein a first fan 11a has a fan air outlet 111a and a fan air inlet 112a, and a second fan 11b has a fan air outlet 111b and a fan air inlet 112b (as shown in FIG. 3). The heat exchange device 10 further includes a heat exchanger 12 provided inside the case 2; a plurality of case air ports 50 provided in the case; and a plurality of adapters 60, each of which is connected to one respective case air port 50. Each adapter is comprised of more than one pipe connecting portions with different diameters, the pipe connecting portion closest to the case air port 50 is indicated as a first pipe connecting portion 61, the pipe connecting portion farthest from the case air port 50 is indicated as a second pipe connecting portion 62, and a diameter of the first pipe connecting portion 61 is larger than a diameter of the second pipe connecting portion 62. In one embodiment, a thermal insulation component 40 is arranged in the adapter 60a connected to the outdoor air inlet 25 and the adapter 60d connected to the outdoor air outlet 26 and is formed therein an air passage 70 for passing air therethrough. Similarly to the heat exchanger 1 in the prior art as described in the background art, in the present disclosure, four air ports 50 are provided on the case 2, as shown in FIG. 2, an outdoor air inlet 25 and an outdoor air outlet 26 are provided at an outdoor side of the case 2, and an indoor air inlet 23 and an indoor air outlet 24 are provided at an indoor side of the case 2. The outdoor air can enter into the case through the outdoor air inlet 25, and the outdoor air entering the case can be blown towards an indoor room through the indoor air outlet 24. The indoor air can enter into the case through the indoor air inlet 23, and the indoor air entering the case can be blown towards outdoor space through the outdoor air outlet 26. The adapter 60a is connected to the outdoor air inlet 25, the adapter 60b is connected to the indoor air outlet 24, the adapter 60c is connected to the indoor air inlet 23, and the adapter 60d is connected to the outdoor air outlet 26.

The heat exchanger 12 is configured to perform heat exchange between the air flowing from the outdoor air inlet 25 to the indoor air outlet 24 and the air flowing from the indoor air inlet 23 to the outdoor air outlet 26. In an embodiment, the adapter 60 is comprised of only the first pipe connecting portion 61 and the second pipe connecting portion 62. The adapter 60 is made of a metal material, and the thermal insulation component 40 is provided in the first pipe connecting portion 61.

Figure 4:
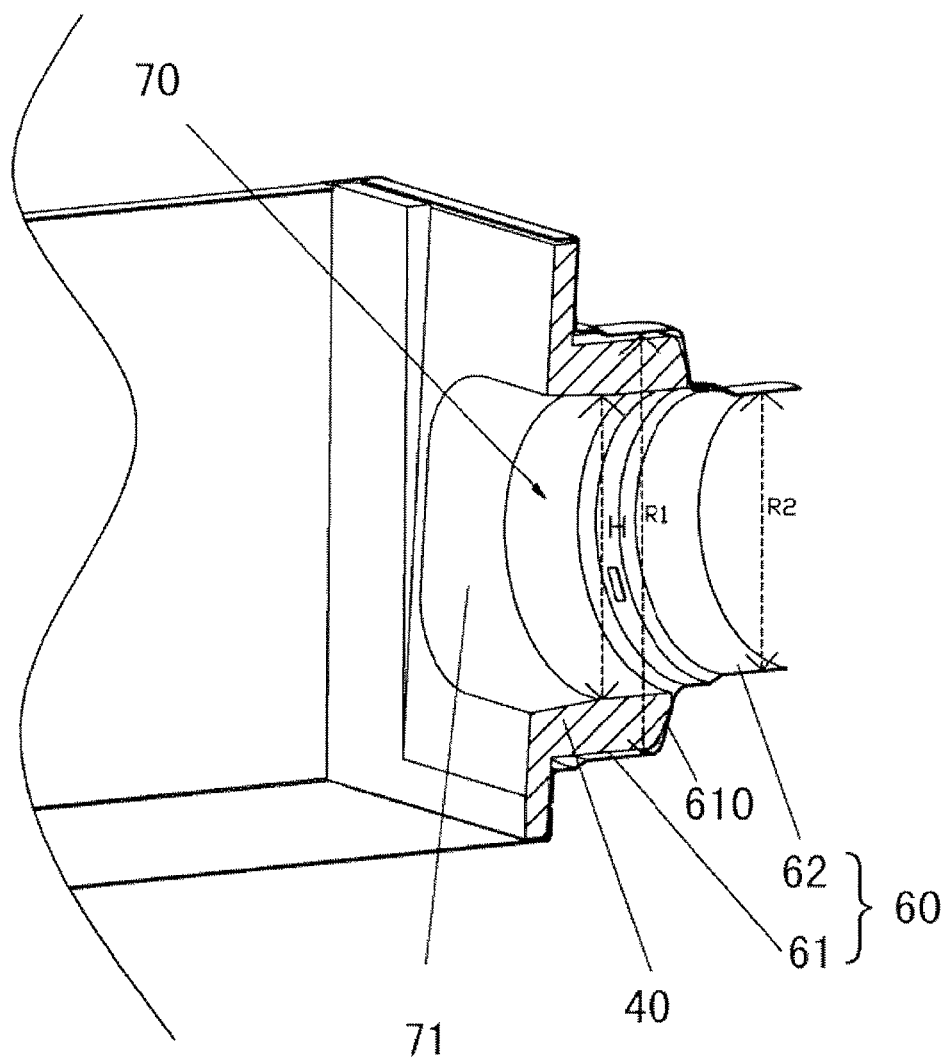
FIG. 4 is a cross-sectional view showing mounting of an case air port and an adapter of the present disclosure.
Figure 5:
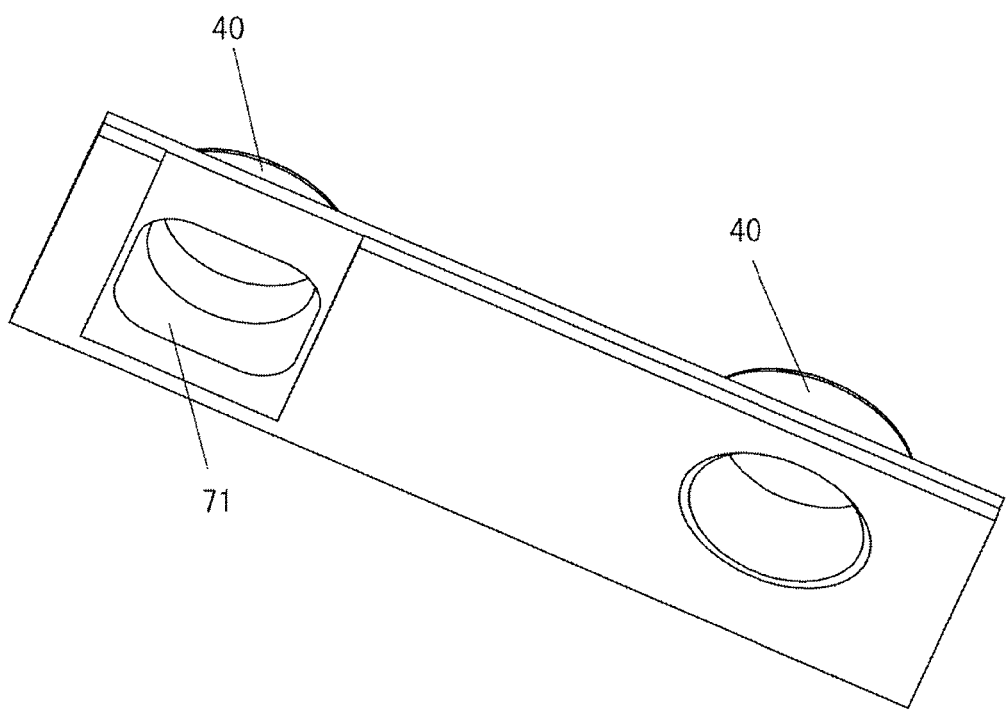
FIG. 5 is a schematic view of a thermal insulation component and an air guiding structure of the present disclosure.

The above described case air port 50 in the embodiment refers in general to the outdoor air inlet 25 or the outdoor air outlet 26 or the indoor air inlet 23 or the indoor air outlet 24 formed in the case 2. FIG. 4 is a cross-sectional view showing mounting of a case air port and an adapter of the present disclosure. FIG. 5 is a schematic view of a thermal insulation component and an air guiding structure of the present disclosure.

Refer to FIGS. 2-5, when the adapter 60 is comprised of more than one pipe connecting portions having different outer diameters, that is to say, the adapter 60 may be comprised of the first pipe connecting portion 61 closest to the case air port 50 and the second pipe connecting portion 62 farthest from the case air port 50, or the adapter 60 may be comprised of the first pipe connecting portion 61, the second pipe connecting portion 62 and a plurality of pipe connecting portions having different diameters provided between the first pipe connecting portion 61 and the second pipe connecting portion 62.

The adapter 60 of the present embodiment is comprised of a first pipe connecting portion 61 having a diameter R1 and a second pipe connecting portion 62 having a diameter R2. The diameter R1 of the first pipe connecting portion 61 is larger than the diameter R2 of the second pipe connecting portion 62.

When a diameter of a known thermal insulation pipe is larger than the diameter R1 of the first pipe connecting portion 61, since the diameter R2 of the second pipe connecting portion 62 is smaller than the diameter R1 of the first pipe connecting portion 61, the diameter R2 of the second pipe connecting portion 62 is smaller than the diameter of the thermal insulation pipe, and the thermal insulation pipe may cover or enwrap both the second pipe connecting portion 62 and the first pipe connecting portion 61, that is, the thermal insulation pipe is capable of covering or enwrapping the whole adapter 60.

When the diameter of a known thermal insulation pipe is larger than the diameter R2 of the second pipe connecting portion 62 but smaller than the diameter R1 of the first pipe connecting portion 61, the thermal insulation pipe is only capable of covering or enwrapping the second pipe connecting portion 62 and is not capable of covering or enwrapping the first pipe connecting portion 61.

Although only the second pipe connecting portion 62 can be covered or enwrapped by the thermal insulation pipe, the thermal insulation component 40 of the present embodiment is provided in the first pipe connecting portion 61 and is formed therein an air passage 70 for passing air therethrough. Therefore, even if cold air enters the first pipe connecting portion 61 that is not covered or enwrapped by the thermal insulation pipe, heat transfer between the cold air and indoor air can also be blocked by the thermal insulation component 40 provided in the first pipe connecting portion 61 and having the air passage 70.

Further, the first pipe connecting portion 61 is formed with an inclined portion 610 at one end closer to the second pipe connecting portion 62. It is preferable that the inclined portion 610 is inclined from the first pipe connecting portion 61 to the second pipe connecting portion 62 such that area of an air passage thereof decreases. Further, it is preferable that an inner side of the inclined portion 610 is in contact with or abuts against the thermal insulation component. According to such configuration, even if only the second pipe connecting portion is covered or enwrapped by the thermal insulation pipe, since the inner side of the inclined portion 610 is in contact with or abuts against the thermal insulation component, condensation at the inclined portion 610 may be effectively suppressed. The inclined portion 610 here is a part of the first pipe connecting portion 61.

In addition, when the adapter 60 is comprised of the first pipe connecting portion 61 having a diameter R1, a second pipe connecting portion 62 having a diameter R2 and a third pipe connecting portion (not shown) having a diameter R3 and provided between the first pipe connecting portion 61 and the second pipe connecting portion 62, the thermal insulation component 40 is provided in the pipe connecting portions except the second pipe connecting portion 62. That is, the thermal insulation component 40 is provided in the first pipe connecting portion 61 and the third pipe connecting portion. The cold air enters the second pipe connecting portion 62 and directly enters the thermal insulation component 40 having the air passage 70 and provided in the first pipe connecting portion 61 and the third pipe connecting portion. In this way, even if only the second pipe connecting portion 62 is covered or enwrapped by the thermal insulation pipe, heat transfer at the first pipe connecting portion 61 and the third pipe connecting portion can be also prevented.

And the like, when the adapter 60 is comprised of a first pipe connecting portion 61 having a diameter R1, a second pipe connecting portion 62 having a diameter R2, and a third pipe connecting portion (not shown) having a diameter of R3 and a fourth pipe connecting portion (not shown) having a diameter of R4 provided between the first pipe connecting portion 61 and the second pipe connecting portion 62, the thermal insulation component 40 with the air passage 70 is provided in the first pipe connecting portion 61, the third pipe connecting portion and the fourth pipe connection.

In addition, since the sponge is a flammable material, if the sponge is bundled around the adapter 60 as in the prior art, the sponge is easily ignited when being close to a fire.

Also the sponge is arranged outside the adapter 60 and thus is liable to be damaged. The thermal insulation component 40 of the present embodiment is provided inside the adapter 60 made of a metal material, so that it is possible to prevent the above phenomena and to prevent occurrence of condensation, thereby improving product safety.

Referring again to FIGS. 4 and 5, the diameter H of the air passage 70 in the present embodiment is greater than or equal to the diameter of the pipe connecting portion having the smallest diameter.

In the present embodiment, the diameter R1 of the first pipe connecting portion 61 is larger than the diameter R2 of the second pipe connecting portion 62, so that the amount of the air flowing through the air inlet or the air outlet depends on the diameter R2 of the second pipe connecting portion 62. In order to ensuring providing sufficient air amount, it is only required the diameter H (i.e., the inner diameter of the heat insulating member 40) of the air passage 70 in the thermal insulation component 40 provided in the first pipe connecting portion 61 is larger than or equal to (i.e., not less than) the diameter of the pipe connecting portion having the smallest diameter (that is, the second pipe connecting portion 62 in the present embodiment), such that the air amount would not be affected by the thermal insulation component 40.

When the adapter 60 is connected to the case air port 50, air is blown from the first pipe connecting portion 61 to the second pipe connecting portion 62, and since the diameter R1 of the first pipe connecting portion 61 is larger than the diameter R2 of the second pipe connecting portion 62, a step wall is formed between the first pipe connecting portion 61 and the second pipe connecting portion 62. In such case, a part of the air may collides with the step wall so that the air cannot smoothly reach the second pipe connecting portion 62, resulting in uneven air, air turbulence, reduced air amount and increased noise.

Therefore, when the diameter H of the air passage 70 of the thermal insulation component 40 is equal to the diameter R2 of the second pipe connecting portion 62, there is no step between the air passage 70 of the thermal insulation component 40 provided in the first pipe connecting portion 61 and the second pipe connecting portion 62, the air can be smoothly guided from the first pipe connecting portion 61 to the second pipe connecting portion 62 and then be discharged, thereby reducing noise and turbulence.

An air guiding structure 71 is provided at the case air port 50, and has the same diameter as the diameter H of the air passage 70 at one end thereof and has the same diameter as the diameter (not shown) of the fan air outlet 111 at the other end thereof.

When the air guiding structure 71 has the same diameter as the diameter H of the air passage 70 of the thermal insulation component 40 at one end and has the same diameter as the diameter of the fan air outlet 111 at the other end, the air guiding structure 71 is in a flared shape or a cylindrical shape.

Since the diameter of the fan air outlet 111 in the present embodiment is larger than the diameter H of the air passage 70 of the thermal insulation component 40, the air guiding structure 71 is in a flared shape. When air is blown out from the fan air outlet 111, the air enters the air guiding structure 71 having the same diameter at one end as that of the fan air outlet 111 and concentrated and blown toward the thermal insulation component 40 having the air passage 70 along the flared shape. In this way, the step due to different diameters of the fan air outlet 111 and the air passage 70 of the thermal insulation component 40 is avoided, and the resultant turbulence, increased noise, and increased pressure loss caused due to the step are avoided.

In an embodiment, the thermal insulation component 40 and the air guiding structure 71 are integrally formed, therefore air passage is smoother, and materials, costs and processing time for the thermal insulation component and the air guiding structure may be saved.

The air guiding structure 71 may be in a flared shape or the like, or may be in a tubular shape having an air passage area gradually increased from one end of the air guiding structure 71 to the other end. According to such configuration, pressure loss may be reduced, so that air flows smoothly inside the air guiding structure 71 and noise is reduced resultantly.

What is claimed is:

1. A heat exchange device, comprising:
   a case,
   a plurality of case air ports provided in the case, comprising:
      an outdoor air inlet through which outdoor air can enter into the case,
      an indoor air outlet through which the outdoor air entering the case can be blown towards an indoor room,
      an indoor air inlet through which indoor air can enter into the case, and
      an outdoor air outlet through which the indoor air entering the case can be blown towards outdoor space,
   a first fan and a second fan both provided inside the case and each having a fan air outlet and a fan air inlet,
   a heat exchanger provided inside the case and configured to perform heat exchange between the air flowing from the outdoor air inlet to the indoor air outlet and the air flowing from the indoor air inlet to the outdoor air outlet,
   a plurality of adapters each connected to one respective case air port at one end thereof, each adapter being comprised of more than one pipe connecting portions with different diameters, the pipe connecting portion closest to the case air port being a first pipe connecting portion, the pipe connecting portion farthest from the case air port being a second pipe connecting portion, the diameter of the first pipe connecting portion being larger than the diameter of the second pipe connecting portion, the first pipe connecting portion being connected to the second pipe connecting portion in serial;
   wherein a thermal insulation component is provided in a first one of the plurality of adapters connected to the outdoor air inlet and a second one of the plurality of adapters connected to the outdoor air outlet, and has an air passage therein for passing air therethrough.

2. The heat exchange device according to claim 1, wherein thermal insulation component is provided in all the other pipe connecting portions except the second pipe connecting portion.

3. The heat exchange device according to claim 2, wherein each adapter is only composed of the first pipe connecting portion and the second pipe connecting portion, and
   wherein each adapter is made of a metal material and the thermal insulation component is provided in the first pipe connecting portion.

4. The heat exchange device according to claim 1, wherein a diameter of the air passage is greater than or equal to a diameter of the pipe connecting portion having the smallest diameter.

5. The heat exchange device according to claim 1, wherein an air guiding structure is provided at the case air port and has one end having the same diameter as a diameter of the air passage and the other end having the same diameter as a diameter of the fan air outlet.

6. The heat exchange device according to claim 5, wherein the thermal insulation component and the air guiding structure are integrally formed.

7. The heat exchange apparatus according to claim 5, wherein the air guiding structure is in a tubular shape having an air passage area gradually increasing from one end of the air guiding structure to the other end.

8. The heat exchange device according to claim 1, wherein the first pipe connecting portion is formed with an inclined portion at one end thereof closer to the second pipe connecting portion;
   wherein the inclined portion is inclined from the first pipe connecting portion to the second pipe connecting portion such that an air passage area decreases from the first pipe connecting portion to the second pipe connecting portion; and
   wherein an inner side of the inclined portion is in contact with the thermal insulation component.

* * * * *